Feb. 3, 1970 N. G. LEMONDE 3,493,731

HYBRID COMPUTER INTERFACE HAVING PLURALITY OF BLOCK ADDRESSABLE CHANNELS

Filed Feb. 17, 1967 5 Sheets-Sheet 1

INVENTOR.
NORMAND G. LEMONDE

BY [signature]

HIS ATTORNEY

INVENTOR.
NORMAND G. LEMONDE
BY [signature]
HIS ATTORNEY

INVENTOR.
NORMAND G. LEMONDE

BY [signature]
HIS ATTORNEY

INVENTOR.
NORMAND G. LEMONDE
BY [signature]
HIS ATTORNEY

INVENTOR.
NORMAND G. LEMONDE
BY
HIS ATTORNEY 3,493,731
HYBRID COMPUTER INTERFACE HAVING PLURALITY OF BLOCK ADDRESSABLE CHANNELS

Normand G. Lemonde, Wall Township, N.J., assignor to Electronic Associates Inc., Long Beach, N.J., a corporation of New Jersey Filed Feb. 17, 1967, Ser. No. 616,969
Int. Cl. G06j *1/00;* H04l *3/00;* H03k *13/00*
U.S. Cl. 235—150.5 1 Claim

ABSTRACT OF THE DISCLOSURE

A hybrid computing system including a digital system and an analog system is provided with a data conversion unit interconnecting the two systems and including a plurality of sample-hold amplifiers connected by a multiplexing unit to an analog to digital converter which amplifiers may be selected by execution of a single digital program instruction the selection being either individually or in any group of amplifiers up to the total number of amplifiers. When selected, the respective amplifiers are placed in a hold mode and automatically returned to sample mode immediately following the completion of the conversion to digital form of each amplifier's analog signal. When an interrupt of the conversion cycle occurs, the address of the amplifier next to be connected for conversion is stored for reinitiation of the conversion cycle when the interrupt conditions have terminated.

This invention relates to a hybrid computer interface and more particularly to such an interface adapted for improved conversion from a plurality of addressable analog channels to sets of digital signals.

Hybrid computer systems comprise an analog computer interconnected with a digital computer, the purpose of the analog computer being to simulate particular conditions to be satisfied which simulation is accomplished with electrical circuits representing an analogy of these conditions. The digital computer in the system, on the other hand, serves to provide sequential control according to a given program of the operation of the analog computation which may be complex and require a plurality of iterative steps. The digital computer also provides large storage capabilities to store various functions required for the analog computation as well as to provide for diagnostic routines and also ancillary computations which require a high degree of accuracy for slowly changing variables.

In operation of the hybrid system under the control of the digital program, the digital system communicates across the hybrid interface to select the particular operational modes of the analog system, to select and provide appropriate resistive values of the potentiometers representing the coefficients of the particular equations involved as well as to supply the initial conditions values with which the computation is to start. When the analog computation has been partially completed it is required to again communicate to the digital system values of the resultant computation and to receive new instructions and related information with which it proceeds to perform additional computations. The control information is normally presented across a separate interface to a control section of the analog computer. However, the timing of the presentation of such control information must be coordinated with the computations being carried out by the analog portion of the system and the computational results communicated back to the digital portion of the system by way of a data interface.

The sampling of analog values for conversion to digital values to be transferred acros the interface to the memory unit is accomplished in response to the execution of program instructions. A particular instruction may be employed to select a sample-hold amplifier connected to a particular analog signal source and to place that amplifier in a hold condition to store the sampled voltage for subsequent conversion to digital signals to be transferred to the memory of the digital system. At some later time that may be chosen for convenience, a separate instruction is then executed by the digital system to convert that voltage to digital form and to transfer he digital signals to memory. In the case of problems which are of a sufficient complexity as to require a hybrid computer system, there are a large number of analog variables which must be sampled. Furthermore, since all parts of the analog simulation are being carried out simultaneously, many analog voltages may require sampling at a given time. In prior art hybrid systems, this problem could be overcome by placing all of the sample-hold amplifiers in the hold condition and then sequentially converting the output of each amplifier to a digital form for transfer to the memory of the digital system. Such a method, however, either placed rigid requirements on the number of analog channels that could be converted or else required a large number of instructions to be executed by the digital system with a resultant delay in the overall program execution.

An additional problem is encountered when an attempt is made to assign different priorities to the more important analog signals to be sampled since the conversion of a higher priority analog signal to digital form could be delayed when lower priority signals are being converted unless other provisions are made.

In addition to the control interface, the analog computer may communicate with the digital portion of the system by way of a separate system interface in addition to the normal data channel by which the digital computer is connected to other peripheral devices through a standard input-output control unit. Thus, sufficient data paths may be provided to allow for any data rate for communication between the digital and analog portions of the system as desired. However, the advantages of such plural data paths are defeated when there is a program execution delay due to a large number of instructions being required for the analog to digital conversion and transfer of data values as well as delays due to higher priority signal conversions being held pending for conversions of lower priority signals.

It is, then, an object of the present invention to provide an improved interface for a hybrid computer system with increased data conversion and throughput.

It is another object of the present invention to provide an improved hybrid computer system wherein analog to digital conversion and transfer of analog signals may be achieved with a minimum number of program instructions.

It is still another object of the present invention to provide a hybrid interface between an analog and digital computing system wherein the analog to digital conversion of lower priority analog signals may be interrupted in favor of higher priority signals.

It is a further object of the present invention to provide a hybrid interface between an analog and digital system wherein interruption of data conversion can be achieved without loss of any data.

Standard hybrid interfaces are normally provided with an analog to digital converter and a digital to analog converter. In the data paths between the analog system and the digital system, the digital to analog converter is normally comprised of a decoding circuit to decode the incoming digital signals in response to which appropriate voltage sources are selected the sum of which repersents the corresponding analog signal to be generated and the digital to analog conversion creates no undue delay in data transfer from the digital system to the analog system. On the other hand, analog to digital conversion requires more time since this type of conversion requires a digital signal generator to sequentially generate digital signals of increasing value which digital signals are converted to an analog value which is compared with the incoming analog signal. When a comparison between the incoming analog signal and the generated analog signal is achieved, the particular set of digital signals responsible for achieving the comparison is then transferred to the digital portion of the system as the digital form of the incoming analog signal whose conversion was desired.

In order to minimize any delay in the conversion of a plurality of analog signals to digital form, such analog signals are simultaneously stored in a plurality of well-known sample-hold amplifiers the outputs of which are sequentially provided to the analog to digital converter by means of a multiplexing circuit with a sufficient delay being provided for the presentation of the next signal so as to allow for conversion of the previous signal.

In a hybrid system, the selection of the respective sample-hold amplifiers, as well as the analog to digital conversion routine, is under the control of the digital program. To minimize the number of instructions required for data conversion and transfer across the hybrid interface, the present invention is adapted to respond to program instructions that may be employed to accomplish six different operations by the analog to digital portion of the hybrid interface. With these instructions, an individual sample-hold amplifier or one or more groups of such amplifiers may be selected and placed in either the track or sampling mode or in the store or hold mode the hold mode being employed to store signals for later conversion and the track mode being merely a release of a hold mode. Furthermore, an individual sample-hold amplifier or one or more groups of such amplifiers may be selected for immediate analog to digital conversion. In this latter operation, the selected amplifiers will automatically be placed in the hold mode if they have not already been placed in this mode at an earlier time. When a group of such amplifiers have been selected for conversion, the amplifier first addressed by the instruction is placed in the hold mode and connected to the converter, the conversion cycle is initiated and, upon completion thereof, that amplifier is automatically returned to the track or sampling mode. An address counter then increments the address specified by the instruction to select the next amplifier and the operation is continued until all amplifiers specified by the instruction have been serviced. Because of the addressing or selection scheme employed, any number of amplifiers can be selected by single instruction within the limits of the system.

In addition to the above, the hybrid system in which the present invention is contemplated to reside, is provided with program interrupt scheme whereby the analog portion of the system can interrupt the program execution when analog signals having a higher priority are required to be sampled and converted for transfer to digital memory. On the occurrence of such an interrupt, an appropriate instruction is selected from memory and presented to the interface to select those sample-hold amplifiers corresponding to the higher priority analog signals. In accordance with the present invention, those amplifiers already selected for a conversion routine which is not yet been completed are maintained in their hold position and their addresses are presented back to the digital computer in the form of status information such that the earlier conversion routine may be again initiated upon the completion of the higher priority conversion routine.

A feature then of the present invention resides in a hybrid computing system having a data conversion unit including a plurality of sample-hold amplifiers and an analog to digital converter and in means for addressing one or a selected group of amplifiers to be placed in a hold condition for subsequent connection to the converter in a sequential manner. The selection of one or a group of amplifiers is in response to a single set of digital signals in the form of an individual instruction which also specifies whether one or group of such amplifiers is to be selected.

An additional feature of the present invention resides in means within the data conversion unit to generate and transmit digital signals representing the status of a current conversion cycle upon the interruption thereof and in means to again initiate that conversion cycle upon fulfillment of the conditions which generated the interrupt.

These and other objects, advantages and features of the present invention will become more readily apparent from a review of the following specification when taken in conjunction with the drawings wherein.

Figure 1:
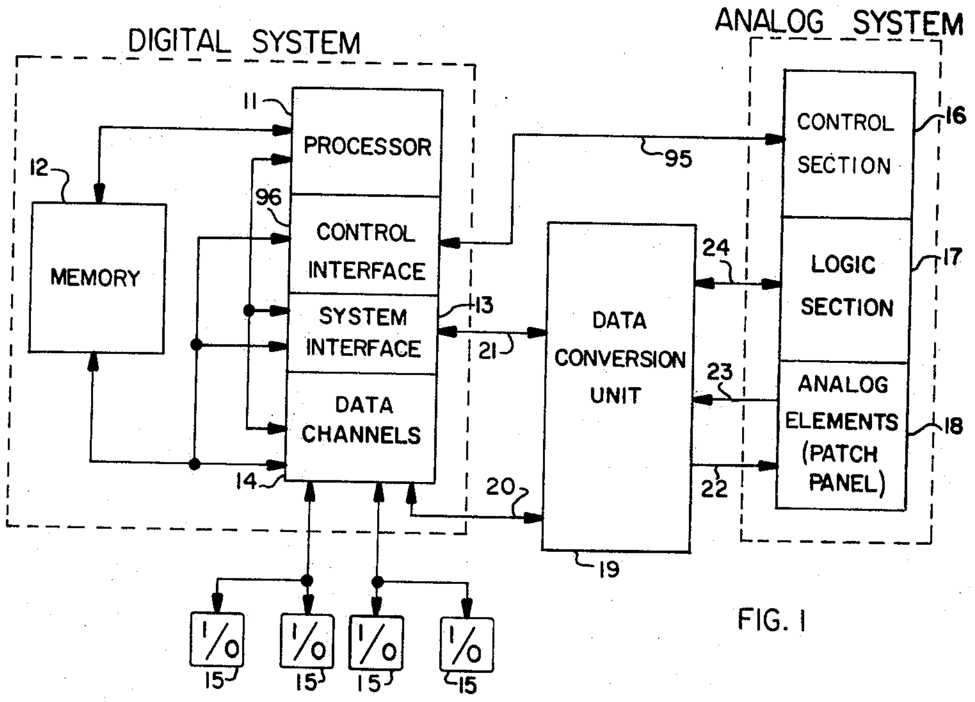
FIGURE 1 is a diagrammatic illustration of a general hybrid system in which the present invention resides.

Since the present invention pertains to program control of a plurality of analog to digital conversion channels, reference is first made to FIGURE 1 which illustrates the general organization of a hybrid computing system. The digital system is of a type known in the art and comprises processor 11 that includes an instruction sequencing control unit, an arithmetic unit and so forth. Instructions and data are supplied to processor 11 from memory 12 which stores such data and other information until needed for subsequent computations. This information and data have been transferred to memory 12 from one or more peripheral devices 15 by way of data channels 14 pursuant to a control word format which transfer may be in a manner interleaved with the communications between processor 11 and memory 12 as will be understood by one skilled in the art. System interface 13 is provided primarily to control communications between memory 12 and the analog portion of the system and is preferably of the direct data channel type having the highest priority in memory accessing.

The analog system, as indicated in FIGURE 1, includes analog element 18 that comprises the operational amplifiers and other analog computing elements, logic panel 17 that is adapted to provide elementary sequencing and other logic functions for the particular analog computations and control panel 16 which controls the various operational modes of the analog system in accordance with instructions executed by the digital system.

Control panel 16 is in communication with control interface 96 by way of control interface bus 95. However, analog input values and related function information are transferred between the analog system and the digital system by way of data conversion unit 19. As illustrated in FIGURE 1, this information transfer may be directly to or from memory 12 by way of system interface 13 or may be transferred by way of data channel 14 in a normal manner in which information is transferred to or from memory 12 and other peripheral devices 15.

Figure 2:
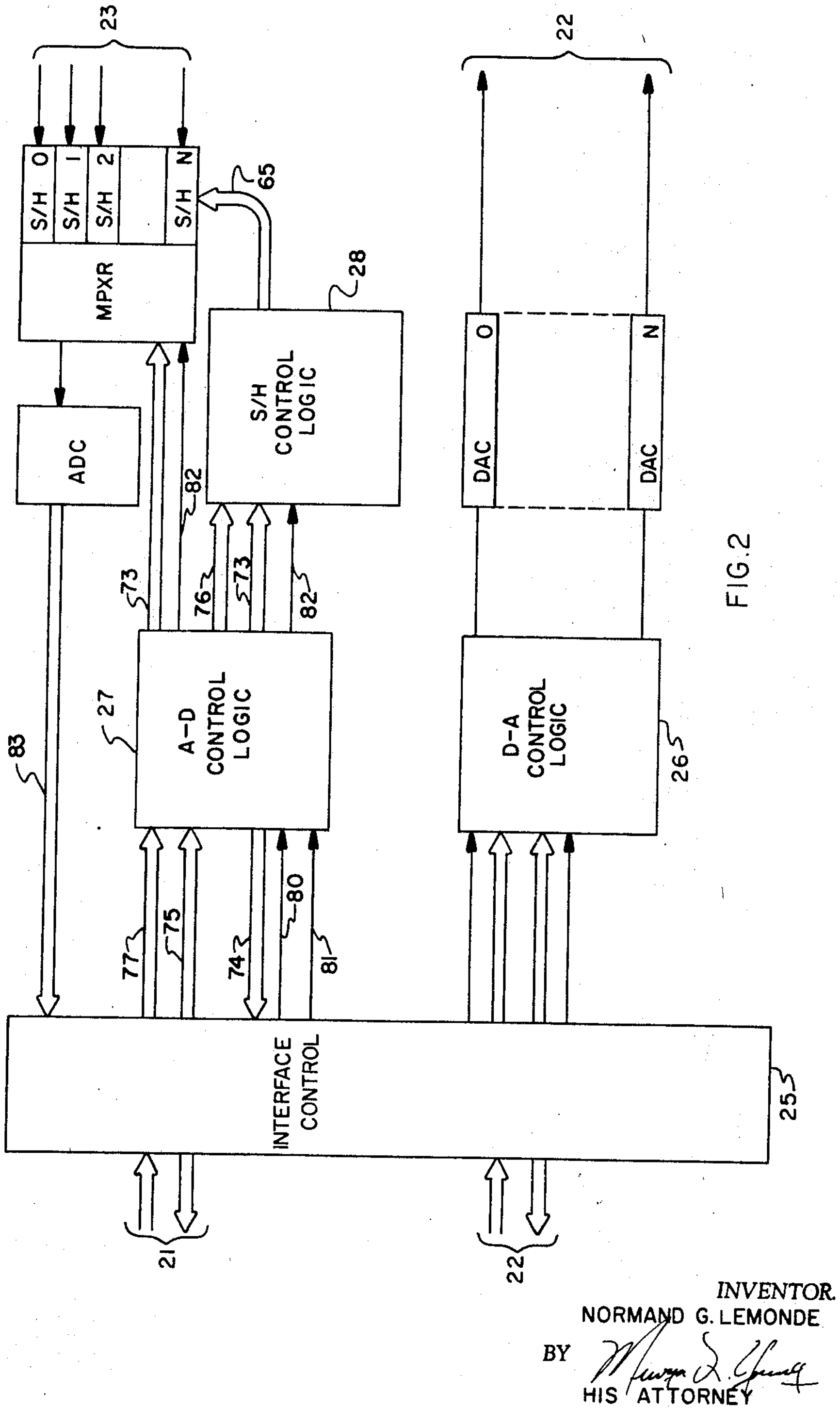
FIGURE 2 is a representation of a data conversion unit for a hybrid system embodying the present invention.

The general organization of data conversion unit 19 is illustrated in FIGURE 2 and includes the digital to analog converters and an analog to digital converter as well as four different control units: interface control 95 that serves to receive and decode instructions from the digital system, digital to analog control 96 that includes the address and command registers to select the various digital to analog converters, analog to digital control 27 that includes the address and command registers to select the respective analog to digital conversion channels and sample-hold control 28 that serves to select the sample-hold amplifiers for subsequent analog to digital conversion.

Figure 4:
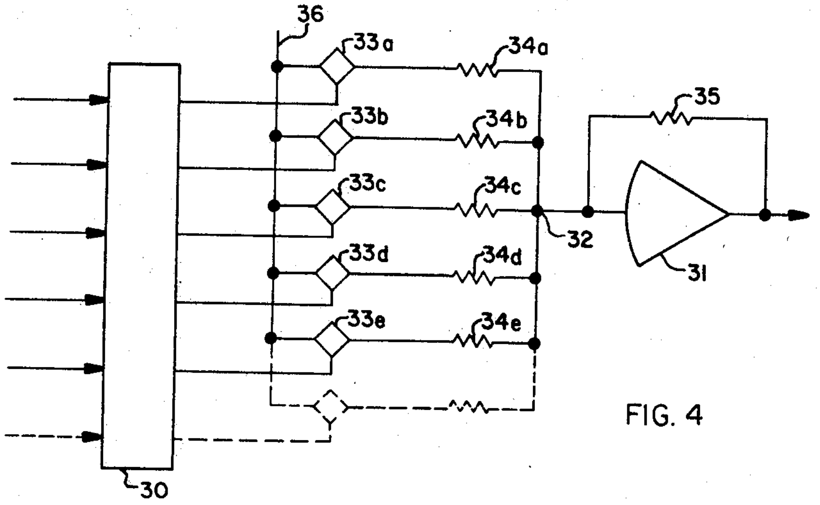
FIGURE 4 is a schematic diagram of a digital to analog converter of the type employed with the present invention.

Before describing the functions of the various control units of the data conversion unit, a better understanding of these functions will be achieved from a brief description of the sample and hold amplifiers and the respective digital to analog and analog to digital converters employed by the conversion system. Referring first to FIGURE 4, there is shown therein a simplified diagram of a typical digital to analog converter that includes register 30 which is adapted to receive the digital signals representative of the value to be converted to analog form. The output leads of the respective bit positions of register 30 are in turn coupled to gates 33*a* . . . 3*e* which, when conductive, place the corresponding resistors 34*a* . . . 34*e* in circuit connection between reference voltage 36 and summing junction 32 in the input circuit to operational amplifier 31. The value of each of the resistances 34*a* . . . 34*e* is so chosen in relation to feedback resistor 35 and the value of reference voltage 36 so as to contribute an appropriate unit of voltage to summing junction 32 corresponding to the respective bit position of register 30. That is to say, when gate 33*a* is placed in conductance, voltage bias of one volt will be presented to summing junction 32, when gate 33*b* is placed in conductance, a two volt voltage bias will be presented to summing junction 32, when gate 33*c* is placed in conductance, a four volt bias will be presented to summing junction 32, when gate 33*d* is placed in conductance, an eight volt bias will be presented to summing junction 32 and so on. It will be understood that each voltage contribution will correspond to the particular significant bit position of the digital signal held in register 30. Upon presentation of the respective digital signals to register 30 an analog voltage signal will immediately be generated which correpsonds to the numerical value of the digital signals.

Figure 5:
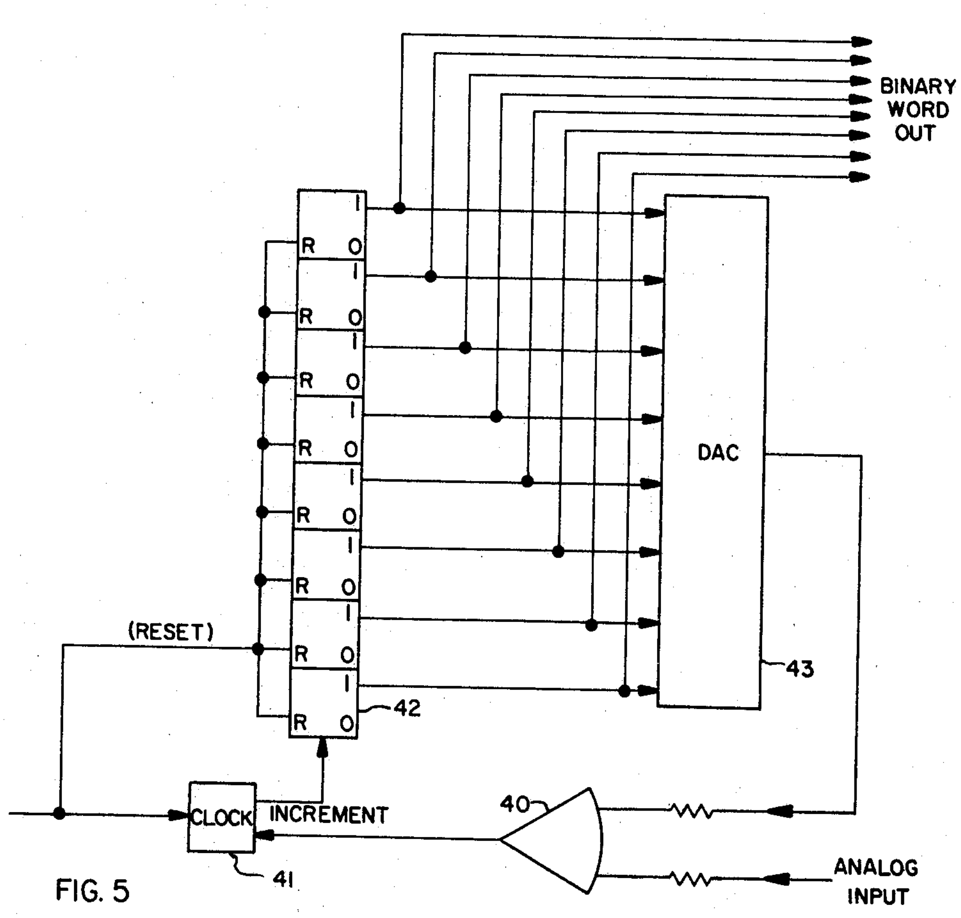
FIGURE 5 is a schematic diagram of analog to digital converter of the type employed with the present invention.

While the digital to analog converter provides almost instantaneous conversion of digital signals to an analog signal, a relatively greater period of time is required for the conversion of an analog signal to digital signals as will be best understood from a description of FIGURE 5 which illustrates a typical analog to digital converter. The analog signal to be converted is presented to voltage comparator 40 at the beginning of the conversion cycle at which time clock 41 is started to increment counter register 42. Counter 42 was reset at the start of the cycle with all its bit positions being zero and after each incrementation, the digital values of the respective bit positions are presented to digital to analog converter 43, the analog output of which is supplied to voltage comparator 42. The process is repeated until the analog output signal from digital to analog converter 43 is equal or approximately equal to the analog signal to be converted and when this comparison occurs there is a zero output voltage presented from the comparator to clock 41 to stop the incrementation and the digital values of counter 42 are then read out as the digital form corresponding to the value of the analog input signal.

The manner in which the various analog signals are stored and multiplexed for sequential presentation to analog to digital converter will now be described in reference to FIGURE 6. A plurality of sample-hold amplifiers, one for each analog channel, are comprised of operational amplifier 45 having a resistor 47 and a capacitor 46 placed in parallel feedback path relation between the input and output terminals of the amplifier. Electrical gate 48 is placed in the input path of amplifier 45 so as to disconnect the amplifier from the analog channel and to remove resistor 47 from its feedback path relation. The amplifier is in a sampling or tracking mode when gate 48 is conducting and the output signal will just be equal to the input signal except that it has been inverted. When the amplifier is in this tracking mode, the voltage drop across capacitor 46 will be directly proportional to the signal being tracked or sampled. When gate 48 ceases to conduct because of the removal of a control signal thereto, the amplifier is disconnected from the analog input channel and the output voltage presented from the amplifier will just be that voltage which was across capacitor 46 at the time when the amplifier was placed in a hold condition.

Figure 6:
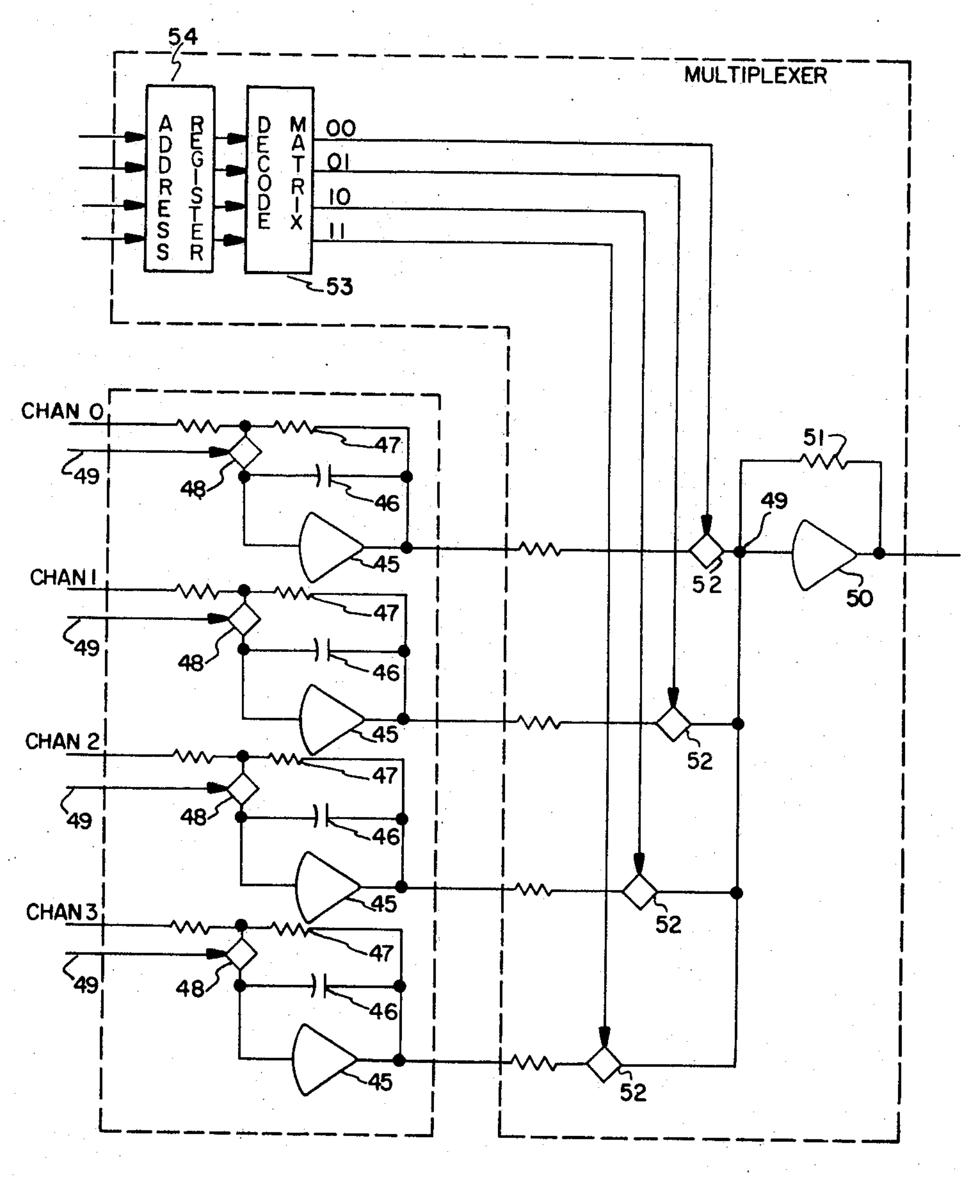
FIGURE 6 is a schematic diagram of a plurality of sample-hold amplifiers of the type employed with the present invention and a multiplexing unit therefor.

As illustrated in FIGURE 6, each of the output signals from the respective sample-hold amplifiers are connected to summing junction 49 of amplifier 50. Because of resistor 51 having been placed in the feedback path of amplifier 50, this amplifier merely serves as an inverter to correct the inversion of the signal by the respective sample-hold amplifiers 45. The output lead of each of amplifiers 45 is coupled to summing junction 49 by way of a plurality of electrical gates 52 each of which may be placed in conductance by an appropriate address being supplied to decode matrix 53. When an individual sample-hold amplifier is to be chosen for connection to the analog to digital converter the address of this amplifier is supplied to the decoded matrix 53 from address register 54. Each time a new address is presented to register 54 (in a manner to be described below) a new channel will be selected for connections to the analog to digital converter.

The format of the instruction word employed to address the respective analog signal channels for individual or group storage by their corresponding sample-hold amplifiers or conversion by the analog to digital converter is illustrated in FIGURE 3*a* as a 16-bit instruction word. Bits 0–3 of this word constitute the operation field of the instruction and are employed to designate the particular operation desired, i.e. random access convert and so forth. Bit positions 4–7 provide a device address within the conversion system such as the analog to digital control unit or the digital to analog control unit. Bit position 8 is used as a modifier bit which may be employed to initiate special commands. Bit positions 9–15 are employed to address the respective analog to digital or digital to analog channels either individually or in groups in accordance with the format that will be described below.

Figure 7:
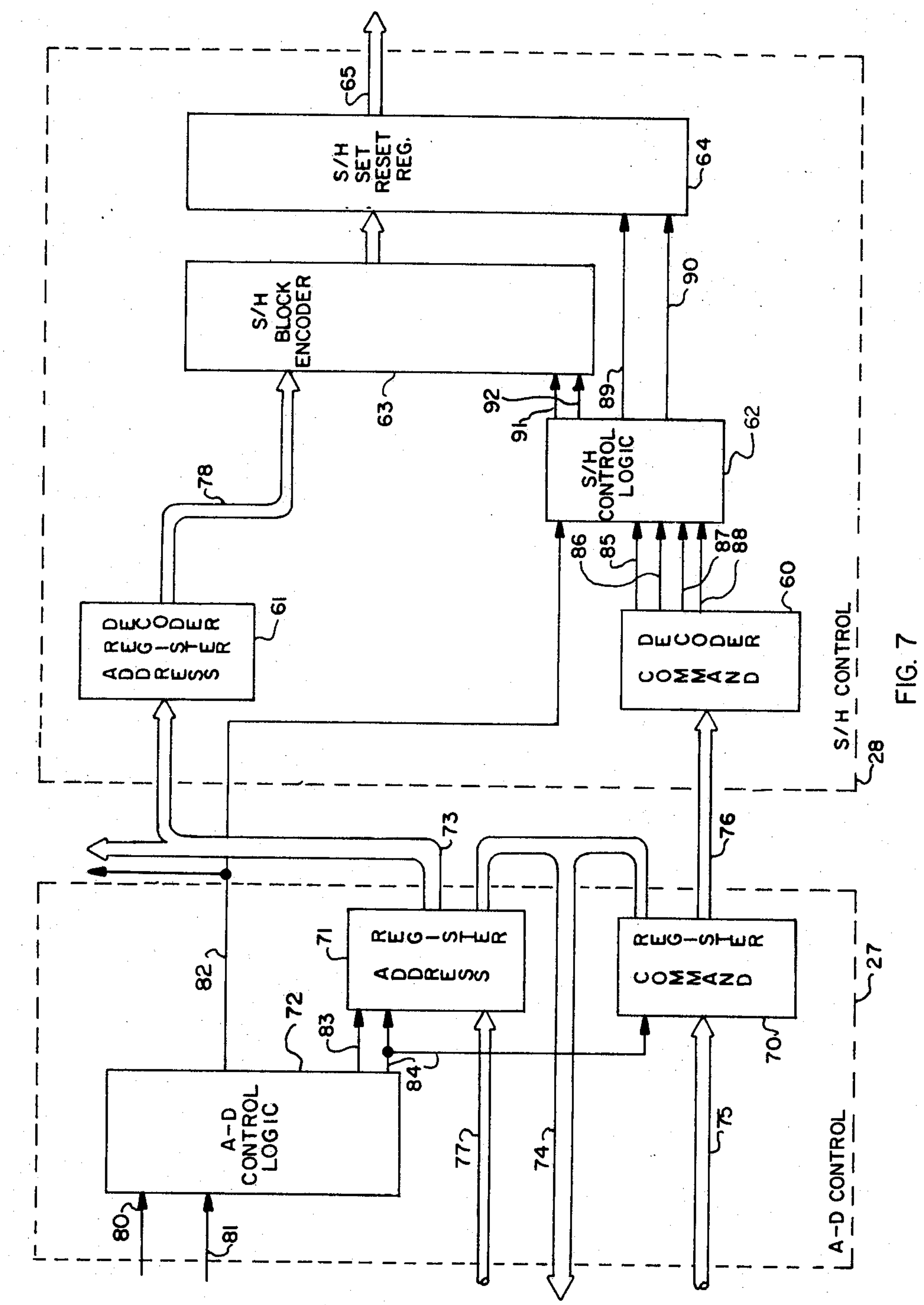
FIGURE 7 is a representation of the conversion and amplifier controls employed with the present invention.

Before describing the particular addressing scheme of the present invention, the function of the data conversion system will be generally described to the extent that relates to the control of analog to digital conversions across the data interface of the system. In FIGURE 7, the analog to digital control is illustrated as primarily comprising command register 70, address register 71 and control logic unit 72. Command register 70 is adapted primarily to receive the four bit command specified in the control instruction word format of FIGURE 3 for subsequent presentation to the sample-hold control unit. Address register 71 is adapted to receive the 7 bit analog channel address for subsequent presentation to the sample-hold control unit as well as address register 54 of the multiplex circuit illustrated in FIGURE 6 and the control logic 72 is adapted primarily to determine the occurrence of the conditions required for the next step of data conversion and transfer and to inform the sample-hold control unit of conditions requiring resetting of the sample-hold amplifiers.

The sample-hold control unit is also illustrated diagrammatically in FIGURE 7 and includes command decoder 60, partial address decoder 61, sample and hold control logic unit 62, block decoder unit 63 and the sample and hold set and reset unit 64 which is formed of a group of flip-flop circuits one of which is assigned to each sample and hold amplifier. Each amplifier is placed in a hold or sample condition in response to a signal indicating that the particular sample-hold amplifier has been addressed and a sample or hold signal received from the sample-hold logic.

Figure 3:
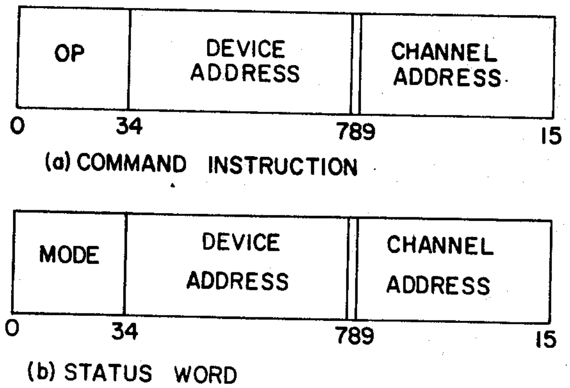
FIGURE 3 is a representation of instruction and status word formats employed with the present invention.

Control and data signals are transferred between the various control units either by single conductors for control signals and plural conductor buses for parallel transferred data and address signals. The data path width of such buses will be understood to be such as to accommodate the number of bits to be transferred in accordance with the command instruction format as indicated in FIGURE 3. Thus the interface input and output 21 and 22 will each accommodate 16 bit positions in addition to appropriate interrupt and other control lines. Address buses 73 and 77 are 7 bits wide and command buses 75 and 76 are 4 bits wide.

For a better understanding of the various units of the data conversion system, a description will now be given of the manner in which a command instruction is received by the system and executed. The command instruction of the format illustrated in FIGURE 3 is retrieved from the digital system memory under the control of the digital program and transferred to interface control 25 of FIGURE 2 either by way of system interface bus 21 or data channel bus 22. Within interface control 25, the device address of the command instruction (bit positions 4–7) is decoded by means not shown to determine that the command instruction is for the analog to digital control or sample-hold control in response to which the remaining portions of the control instruction are transferred over address bus 77 to address register 71 and command bus 75 to command register 70.

When the command is to select sample-hold amplifiers, the contents of address register 71 are also supplied over bus 73 to address decoder 61 while the contents of command register 70 are supplied across bus 76 to command decoder 60. In response to the particular address decoded, command decoder 60 then supplies a signal over either "single" line 85 or block line 86 to the sample and hold control logic 62 to indicate whether a single or group of amplifiers have been selected. Signals supplied to control logic 62 over sample line 87 or hold line 88 indicate whether the selected amplifiers are to be placed in the sample condition or the hold condition. Control logic 62 in turn supplies a signal over either sample line 89 or hold line 90 to indicate to the set and reset unit 64 as to whether the particular amplifier flip flops specified by block decoder 63 are to be placed in the sample mode or the hold mode. The output signals from the respective flip flops of set register 64 are in turn supplied over individual lines of bus 65 to the respective control lines 49 of the individual sample-hold amplifiers as illustrated in FIGURE 6.

In this manner, an individual sample-hold amplifier or any particular block of such amplifiers may be placed in hold mode or sample mode by a single command instruction. Once the flip flops of set register 64 have been set, they will remain in that condition until such time as a new command instruction has been received by the data conversion unit or a particular amplifier is to be returned to a sample mode. The four commands that may be employed by the operation field of the command instruction to select and set the various sample-hold amplifiers are: individual sample, individual hold, block sample, and block hold. As will be explained in further detail below, the channel address will have different significance depending upon whether the command instruction specifies an individual selection or a block selection.

After the selected sample-hold amplifiers have been placed in their hold condition, a subsequent command instruction is required to initiate the analog to digital conversion and data transfer to the digital system. The individual commands that can be specified for such conversion and transfer by the command instruction are either a single conversion or multiple sequential conversions which operations are specified by the operation field of the command instruction. Upon the receipt of this command by interface control unit 25, the device address field (bit positions 4–7) is again decoded by means within the control unit 25 in response to which the channel address field (positions 9–15) are transferred to address register 71. At the same time, the operation field (bit position 0–3) is decoded to determine whether a conversion is required and whether single conversion or a plurality of sequential conversions have been specified. These conditions are indicated to the analog to digital control logic 72 by conversion line 80 in response to which the contents of address register 71 are transferred over data bus 73 to address register 54 of the multiplexer as illustrated in FIGURE 6 and to address register 61 of the sample-hold control unit. At the same time, the analog to digital control logic generates a signal to the analog to digital converter by way of execute line 82 to begin the conversion of the analog signals being stored in the sample-hold amplifier by the address transferred to the multiplexer. The digital signals generated by the analog to digital converter are transferred to a register in interface control 25 of FIGURE 2 and then across data bus 21 or data bus 22 to the digital system under control of the digital system. This data transfer to the digital system is pursuant to an instruction executed by the digital system for this purpose. When the digital system completes the transfer of this data across the respective interface, interface control 25 again generates a conversion execute signal which is transferred over conductor 80 to the analog to digital control logic 72 in turn signals address register 71 to increment its conents which are then transferred by way of data bus 73 to address register 54 of the multiplexer as indicated in FIGURE 6. In the meantime, the previous address which was also transferred to address register 61 is again presented to block decoder 63 and the sample and hold control logic unit 62 provides the appropriate sample signal over conductor 89 which indicates to set register 64 that the particular flip flop in set register 64 which has been addressed is to be reset to place its corresponding sample-hold amplifier in a sample mode.

The analog to digital conversion cycle is repeated and a new set of data signals transferred from the analog to digital converter back to interface control 25. Each time the digital system completes a transfer of data across one of the data interfaces 21 or 22, a new analog to digital conversion cycle is initiated with the routine continuing until no further requests are received from the digital system as determined by the transfer instructions being executed by the digital system.

With the exception of the command instruction specifying a block selection of sample and hold amplifiers, the channel address specified in each instruction is the address of a particular channel selected for the operation specified by the operation field of the command instruction. As indicated above, these operations include selecting a single channel for an analog to digital conversion routine, selecting a plurality of channels for a plurality of sequential conversion routines starting with the particular channel addressed, and selecting a particular sample and hold amplifier to be placed in either the sample or hold condition. However, when the operation specified by the instruction is that of selecting a block of sample and hold amplifiers to be placed in either a sample condition or a hold condition, block encoder 63 interprets the address presented to it from address register 61 in a different manner when a signal is received from sample and hold control logic 62 indicating that block addressing is called for. The manner in which the respective addresses are interpreted for block addressing are listed in the following table:

| Block address | Channels selected | Block address | Channels selected |
|---|---|---|---|
| 0 | 0–1 | 16 | 16–17 |
| 1 | 0–3 | 17 | 16–19 |
| 2 | 2–3 | 18 | 18–19 |
| 3 | 0–7 | 19 | 16–23 |
| 4 | 4–5 | 20 | 20–21 |
| 5 | 4–7 | 21 | 20–23 |
| 6 | 6–7 | 22 | 22–23 |
| 7 | 0–15 | 23 | 16–31 |
| 8 | 8–9 | 24 | 24–25 |
| 9 | 8–11 | 25 | 24–27 |
| 10 | 10–11 | 26 | 26–27 |
| 11 | 8–15 | 27 | 24–31 |
| 12 | 12–13 | 28 | 28–29 |
| 13 | 12–15 | 29 | 28–31 |
| 14 | 14–15 | 30 | 30–31 |
| 15 | 0–31 | 31 | 0–63 |

The above table is only a partial listing of the various groupings of amplifiers that may be selected by the addressing scheme of the present invention. However, this table should be sufficient to indicate the manner in which such group addressing is achieved. Since the address format as indicated by the control instruction of FIGURE 3 contains 7 bit positions, it will be appreciated that up to 128 elements may be individually selected, this format being chosen to accommodate 128 analog signal channels between the analog computer and the analog to digital converter. As suggested, by the above table, the block addressing scheme allows for the addressing of: groups of two adjacent channels beginning with channel 0 and each channel having an even address, groups of four adjacent channels beginning with the channel 0 and channels having an address which is a multiple of four, groups of 8 adjacent channels, beginning with channel 0 and a channel whose address is a multiple of 8, groups of 16 adjacent channels, beginning with channel 0 and a channel whose address is a multiple of 16, groups of 32 adjacent channels beginning with channel 0 and a channel whose address is a multiple of 32, as well as the groups of channels 0–63, channels 64–127 and channels 0–127.

It can be readily determined from the above scheme that the number of various groups thus addressable is 127 which is within the limits of the addressing scheme that provides for 128 addresses.

A particular advantage of this addressing scheme is that separate groups of channels and their corresponding analog elements may be assigned to different simulation problems with separate programs being executed by the digital processor of the hybrid system. Furthermore, the hybrid system may be provided with a plurality of peripheral terminals to allow for time sharing of the hybrid system by a plurality of different users. Such time sharing and multi-programming would not be possible unless there were some provision to allow for the selection of only particular channels for data transfer and conversion without disturbing other channels designated for other programs. The addressing method and apparatus of the present invention accommodates the above described purposes.

It will be further appreciated that the present invention can also be employed for the digital to analog conversion channels which are generally illustrated in FIGURE 2 but have not been described in detail. The only requirement for the adaptation of the addressing method and apparatus of the present invention to the digital to analog channels is that the digital to analog converters be double buffered so that respective data words which are supplied to the conversion unit sequentially can be stored in the respectively addressed digital to analog converters until such time as sufficient data in digital form is received to allow for simultaneous conversion and transfer across respective channels. Such simultaneous transfer is desirable to prevent time skew of the respective signals as will be understood by one skilled in the art. As in the case of the analog to digital channels, the block or group addressing method of the present invention is particularly desirable when different channels have been assigned to different simulation problems.

An additional feature in accordance with the present invention is the provision for retaining status information for return to the digital system upon occurrence of a condition which requires the interruption of the digital program currently being executed. Such a condition may require that servicing of the current analog channels be interrupted and that other channels be serviced. In such a situation, the digital system would signal the conversion unit and transfer a new command instruction to the conversion unit which would be handled in the normal manner. In response to this condition, an interrupt signal would be transferred from interface control 25 of FIGURE 2 across interrupt line 81 to analog to digital control logic 72 of FIGURE 7. This signal inhibits further conversion cycles from being initiated by control logic 72. The signal generated by control logic 72 is transmitted over interrupt line 84 to address register 71 and command register 70 to cause the contents of these registers to be transferred over bus 74 back to interface logic 25, the information being assembled into a status word format as indicated in FIGURE 3*b*. This status word is then transferred back to digital system for storage until such time as the interrupted conversion routine can be continued.

While the various circuits of the logic and control units as well as the particular registers have not been described, it is believed that such circuits can be fabricated by persons skilled in the art and that such registers as well as the gating circuits associated therewith are well known to persons skilled in the art. Furthermore, it will be understood that only particular embodiments in the present invention have been described and variations and modifications of these embodiments will occur to persons skilled in the art which variations and modifications will nevertheless be within the scope of the invention as claimed.

What is claimed is:

1. In a hybrid computer system having a digital computer and an analog computer, a plurality of analog signal channels coupled to said analog computer, a conversion unit coupled between said computers including an address bus coupled to said digital computer to receive sets of digital signals, each set corresponding to a particular one of said channels and also corresponding to a particular grouping of said channels, addressing means coupled to said address bus and to said channels to select an individual channel or a group of channels in response to one of said sets of digital signals, control means coupled to said digital system and to said addressing means to set said addressing means to select a particular channel or grouping of channels, a plurality of sample-hold amplifiers, each of which is connected to a particular analog signal channel, which amplifiers may be placed in either a hold condition or in a sampling condition in response to selection of said amplifiers by said addressing means, an analog to digital converter coupled to said digital computer and selectably connected to said sample-hold amplifiers, each of which is selected for connection to said converter in response to said digital signals received by said addressing means, and a plurality of digital to analog converters each of which is connected to a particular channel and selectably coupled to said digital computer in response to selection by said addressing means, the improvement in said addressing means comprising:

an address register connected to said control means for storing digital signals representing the number of said sample-hold amplifiers required for analog to digital conversion, a command register connected to said control means for storing digital signals to place said sample-hold amplifiers in either said sample or said hold condition, decoding and encoding means connected to said address register for formatting the contents of said address register, decoding and control means connected to said command register for producing single or block sample-hold condition signals, and a sample-hold se-reset register means connected to receive the output of said formatting means and said condition signals, for controlling said sample-hold amplifiers in accordance with said sets of digital signals.

References Cited

UNITED STATES PATENTS

| | | | |
|---|---|---|---|
| 3,146,343 | 8/1964 | Young | 235—150.52 X |
| 3,317,717 | 5/1967 | Schumann | 235—150.5 X |
| 3,330,943 | 7/1967 | Hawkins | 235—150.5 |
| 3,406,379 | 10/1968 | Palevsky et al. | 235—150.5 |
| 3,413,453 | 11/1968 | Thorpe | 235—150.51 X |

EUGENE G. BOTZ, Primary Examiner

J. F. RUGGIERO, Assistant Examiner

U.S. Cl. X.R.

340—347